United States Patent
Sandholm et al.

(10) Patent No.: US 9,792,717 B2
(45) Date of Patent: Oct. 17, 2017

(54) INTERACTIVE SLIDE DECK

(71) Applicant: Hewlett-Packard Development Company, L.P., Houston, TX (US)

(72) Inventors: Thomas E. Sandholm, Palo Alto, CA (US); Anupriya Ankolekar, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 94 days.

(21) Appl. No.: 14/780,352

(22) PCT Filed: Mar. 29, 2013

(86) PCT No.: PCT/US2013/034689
§ 371 (c)(1),
(2) Date: Sep. 25, 2015

(87) PCT Pub. No.: WO2014/158195
PCT Pub. Date: Oct. 2, 2014

(65) Prior Publication Data
US 2016/0055663 A1    Feb. 25, 2016

(51) Int. Cl.
*G06T 13/80* (2011.01)
*G06T 3/40* (2006.01)
*G06T 7/20* (2017.01)

(52) U.S. Cl.
CPC .......... *G06T 13/80* (2013.01); *G06T 3/4038* (2013.01); *G06T 7/20* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 6,278,466 B1 | 8/2001 | Chen | |
| 6,342,904 B1 * | 1/2002 | Vasudevan | H04N 19/587 375/E7.253 |
| 6,646,655 B1 * | 11/2003 | Brandt | H04N 5/06 348/E5.011 |

(Continued)

FOREIGN PATENT DOCUMENTS

| | | |
|---|---|---|
| EP | 0729271 A2 | 8/1996 |
| EP | 0677187 B1 | 9/2002 |

OTHER PUBLICATIONS

Wayne Niblack, Stanley Yue, Reiner Kraft, Arnon Amir, Neel Sundaresan, "Web-Based Searching and Browsing of Multimedia Data", Aug. 2, 2000, IEEE, 2000 IEEE International Conference on Multimedia and Expo, pp. 1717-1720.*

(Continued)

*Primary Examiner* — Robert Bader
(74) *Attorney, Agent, or Firm* — Mannava & Kang, P.C.

(57) ABSTRACT

According to an example, a series of video frames may be accessed, in which a first set of the video frames depicts segments of an entity moving relative to other entities in the video frames and wherein a second set of the video frames depicts static content. In addition, the video frames in the first set of video frames may be generated into animated image files and the video frames in the second set of video frames into single image files. Furthermore, the animated image files and the single image files may be arranged into an interactive slide deck.

11 Claims, 5 Drawing Sheets

(56) References Cited

U.S. PATENT DOCUMENTS

| | | | | |
|---|---|---|---|---|
| 7,003,154 | B1* | 2/2006 | Peker | H04N 19/172 |
| | | | | 375/E7.145 |
| 8,687,941 | B2* | 4/2014 | Dirik | H04N 5/147 |
| | | | | 386/240 |
| 2005/0021552 | A1 | 1/2005 | Ackley et al. | |
| 2005/0058431 | A1 | 3/2005 | Jia et al. | |
| 2007/0186166 | A1 | 8/2007 | Anderson et al. | |

OTHER PUBLICATIONS

Luis Herranz, Fabricio Tiburzi, and Jesus Bescos, "An Engine for Content-Aware On-Line Video Adaptation", 2006, Springer, International Conference on Semantic and Digital Media Technologies, SAMT 2006, Lecture Notes in Computer Science, vol. 4306, pp. 101-112.*

Jeho Nam, Ahmed H. Tewfik, "Event-Driven Video Abstraction and Visualization", Jan. 2002, Kluwer Academic Publishers, Multimedia Tools and Applications, vol. 16, pp. 55-77.*

Brainshark, Create, Share & Track, (Web Page), Retrieved Mar. 29, 2013, 4 Pages, http://www.brainshark.com/what-is-brainshark/create-share-track.aspx.

International Searching Authority, The International Search Report and the Written Opinion, Dec. 16, 2013, 9 Pages.

* cited by examiner

INTERACTIVE SLIDE DECK

BACKGROUND

Presentation slides are often transformed into videos or static images, such as in portable document format, to enable the presentation slides to be viewed on multiple devices either during a live presentation or at a later time following the live presentation. Oftentimes, the presentation slides include animation to enhance or focus desired effects onto various contents in the presentation slides. Transformation of the presentation slides into videos may enable the animations to be maintained, however, the ability to navigate and control the video like a slide deck is lost. In addition, transformation of the presentation slides into static images results in loss of animation support from the presentation slides.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are a method of and a computing apparatus to generate an interactive slide deck. More particularly, the method and computing apparatus disclosed herein may generate an interactive slide deck from a series of video frames, in which the interactive slide deck maintains movement of an entity with respect to other entities within a respective slide. Thus, for instance, the interactive slide deck may include an animated image file that depicts an animation contained in a presentation slide.

The interactive slide deck may be converted and stored into a plurality of formats and/or resolutions to be accessible by a number of different types of devices. For instance, the interactive slide deck may be stored in formats and/or resolutions that may be accessible on personal computers, mobile devices, tablet computers, etc.

Through implementation of the method and computing apparatus disclosed herein, presentation slides having animations may be transformed, along with presentation slides that do not contain animations, into an interactive slide deck that may be accessible over the web by a plurality of types of devices, easily shared, and navigated. In one regard, therefore, the interactive slide deck disclosed herein may avoid at least some of the limitations experienced with conventional presentation slide transformation techniques. Moreover, the interactive slide deck disclosed herein may be viewed in various types of web browsers and may not require native applications or plugins for the interactive slide deck to be viewed.

Figure 1:
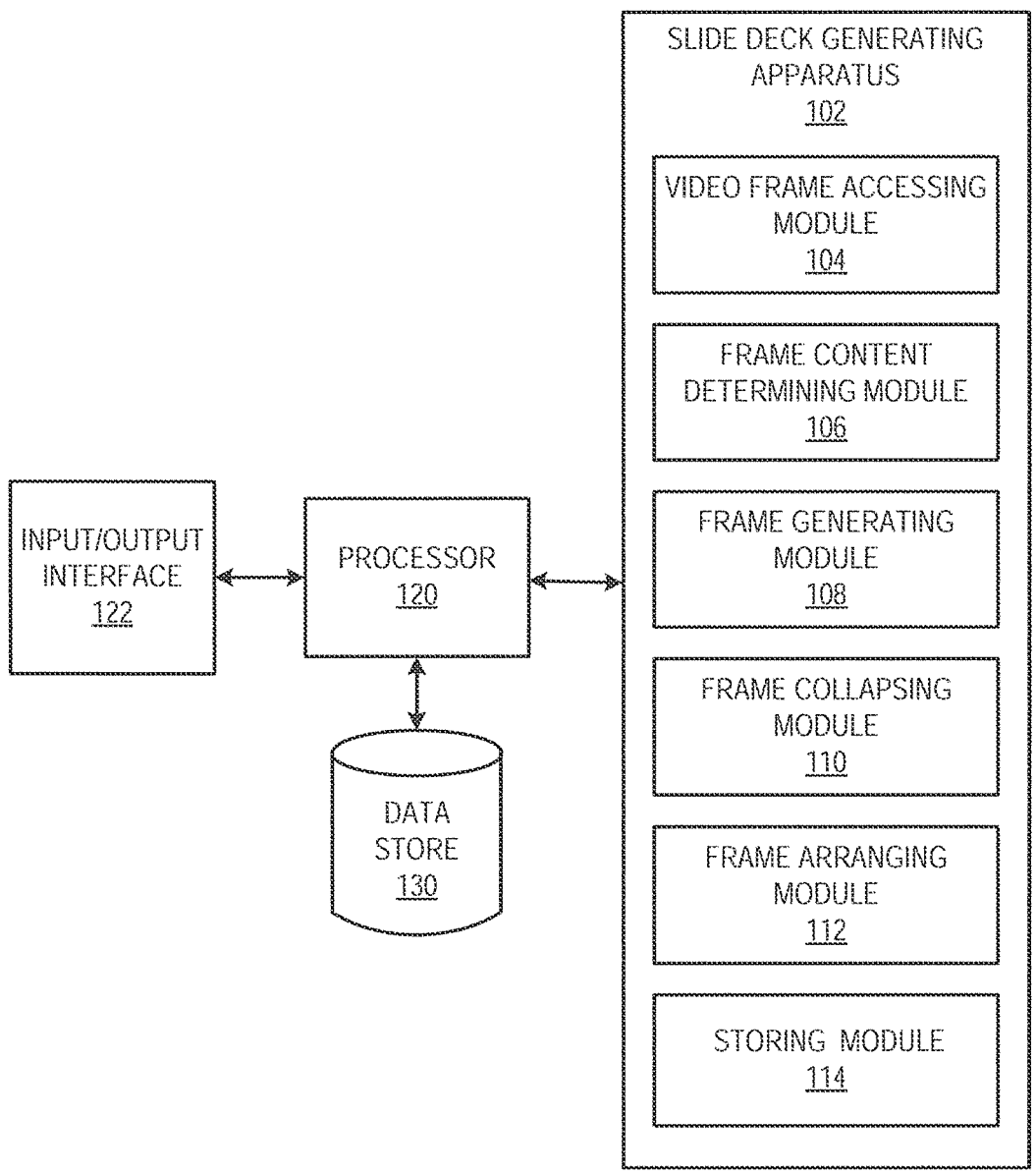
FIG. 1 depicts a simplified block diagram of a computing apparatus, according to an example of the present disclosure.

With reference first to FIG. 1, there is shown a simplified block diagram of a computing apparatus 100, which may implement various features disclosed herein, according to an example. It should be understood that the computing apparatus 100 may include additional elements and that some of the elements depicted therein may be removed and/or modified without departing from a scope of the computing apparatus 100.

Generally speaking, the computing apparatus 100 may be a desktop computer, a server, a laptop computer, a tablet computer, etc., at which an interactive slide deck may be generated as discussed in greater detail herein. The computing apparatus 100 is depicted as including a slide deck generating apparatus 102, a processor 120, an input/output interface 122, and a data store 130. The slide deck generating apparatus 102 is also depicted as including a video frame accessing module 104, a frame content determining module 106, a frame generating module 108, a frame collapsing module 110, a frame arranging module 112, and a storing module 114.

The processor 120, which may be a microprocessor, a micro-controller, an application specific integrated circuit (ASIC), and the like, is to perform various processing functions in the computing apparatus 100. One of the processing functions may include invoking or implementing the modules 104-114 of the slide deck generating apparatus 102 as discussed in greater detail herein below. According to an example, the slide deck generating apparatus 102 is a hardware device, such as, a circuit or multiple circuits arranged on a board. In this example, the modules 104-114 may be circuit components or individual circuits.

According to another example, the slide deck generating apparatus 102 is a hardware device, for instance, a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like, on which software may be stored. In this example, the modules 104-114 may be software modules stored in the slide deck generating apparatus 102. According to a further example, the modules 104-114 may be a combination of hardware and software modules.

The processor 120 may store data in the data store 130 and may use the data in implementing the modules 104-114. The data store 130 may be volatile and/or non-volatile memory, such as DRAM, EEPROM, MRAM, phase change RAM (PCRAM), Memristor, flash memory, and the like. In addition, or alternatively, the data store 130 may be a device that may read from and write to a removable media, such as, a floppy disk, a CD-ROM, a DVD-ROM, or other optical or magnetic media.

Figure 2:
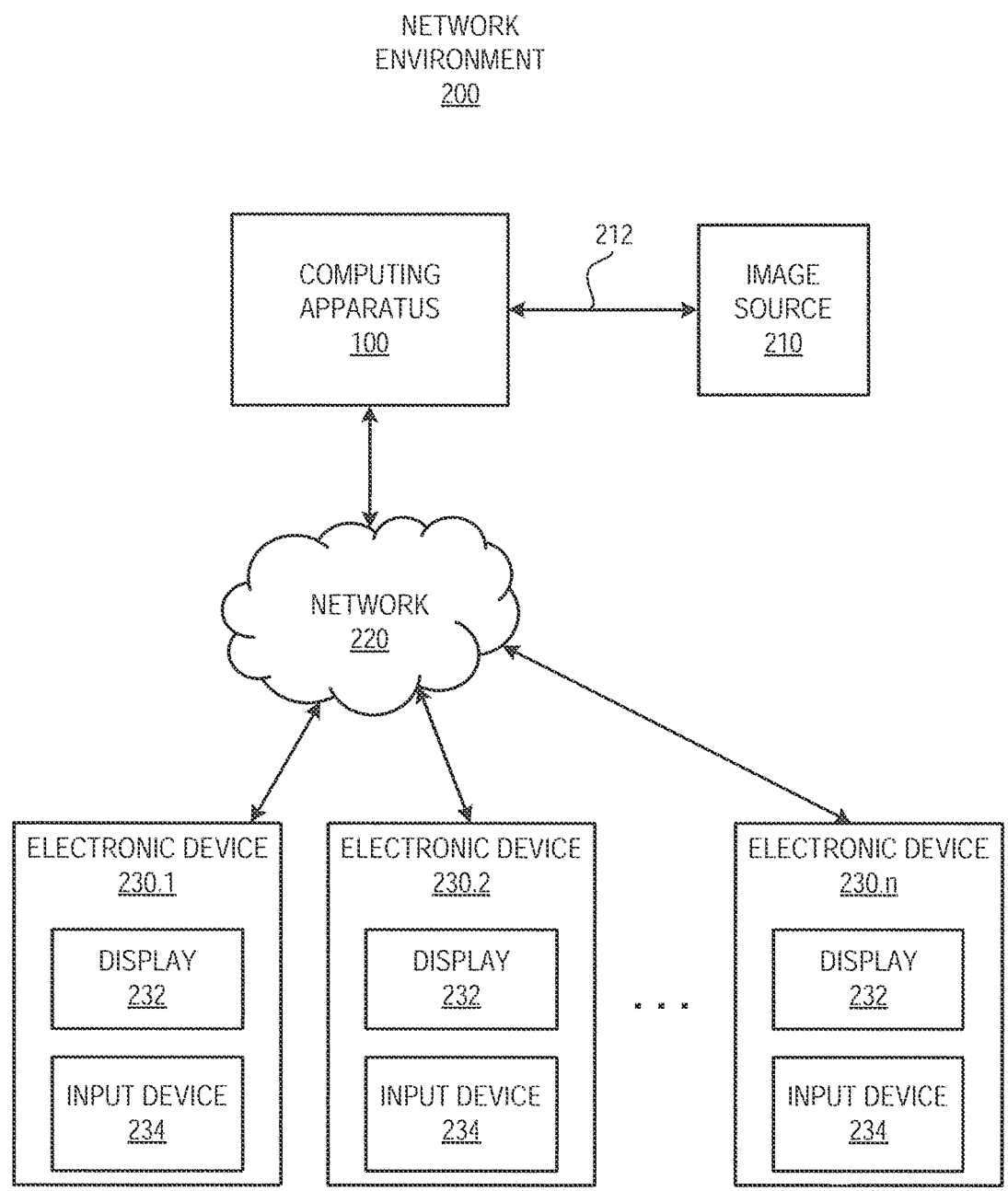
FIG. 2 depicts a simplified block diagram of a network environment including the computing apparatus depicted in FIG. 1, according to an example of the present disclosure.

The input/output interface 122 may include hardware and/or software to enable the processor 120 to communicate with a video frame source device (shown in FIG. 2). In addition, the input/output interface 122 may include hardware and/or software to enable the processor 120 to communicate over a network, such as the Internet, a local area network, a wide area network, a cellular network, etc.

Figure 3:
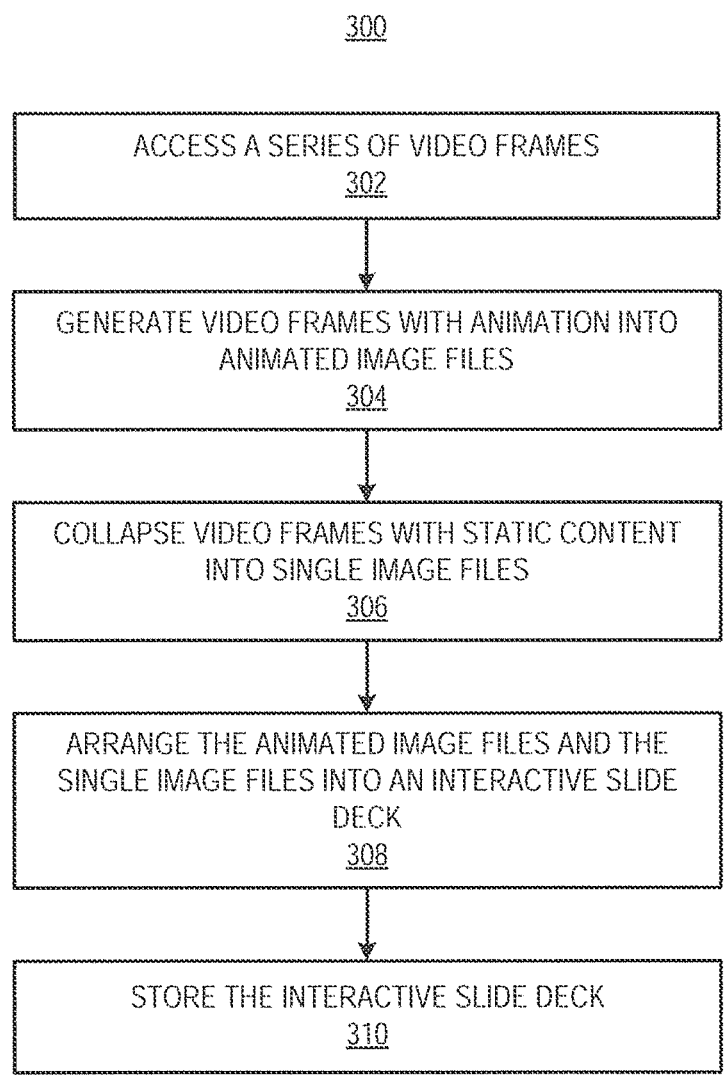
FIG. 3 depicts a flow diagram of a method of generating an interactive slide deck, according to an example of the present disclosure.

Various manners in which the slide deck apparatus 102 in general and the modules 104-114 in particular may be implemented are discussed in greater detail with respect to the method 300 depicted in FIG. 3. Prior to discussion of the method 300, however, reference is made to FIG. 2, in which is shown a simplified block diagram of a network environment 200 including the computing apparatus 100 depicted in FIG. 1, according to an example. It should be understood that the network environment 200 may include additional elements and that some of the elements depicted therein may be removed and/or modified without departing from a scope of the network environment 200.

As shown in FIG. 2, the computing apparatus 100 may receive images from an image source 210, as indicated by the arrow 212. The image source 210 may be an electronic device on which a set of presentation slides are stored, such as a computer, a storage device, a projector, etc. In addition or alternatively, the image source 210 may be an electronic device that is to capture and/or store captured images, such as presentation slides being displayed by a projector, images of presentation slides captured by a camera, images captured by a surveillance camera, etc. In other examples, the image source 210 may be integrated into the computing apparatus 100. In any regard, the computing apparatus 100 may process the images as discussed herein to generate an interactive slide deck, or equivalently, an interactive series of slides.

According to an example, the computing apparatus 100 is also to store the generated interactive slide deck to be accessible by a plurality of electronic devices 230.1-230.*n*, in which the variable "n" denotes an integer greater than one. The electronic devices 230.1-230.*n* may be any of, for instance, laptop computers, tablet computers, personal digital assistants, cellular telephones, desktop computers, etc. In addition, the computing apparatus 100 may store the generated interactive slide deck in multiple types of formats and/or resolutions to enable different types of electronic devices 230.1-230.*n* to access and display the generated interactive slide deck. For instance, the interactive slide deck may be displayed on a display 232 of an electronic device 230.1 and a user may interact with the interactive slide deck through input of instructions through an input device 234, which may be a keyboard, a mouse, a touchscreen, etc. By way of particular example, a user may select slides in the slide deck to view from, for instance, a listing of thumbnails representing the slides.

According to an example, the interactive slide deck is stored on the computing apparatus 100 and the electronic devices 230.1-230.*n* may access the interactive slide deck from the computing apparatus 100. In another example, the computing apparatus 100 may store the interactive slide deck on a database accessible by the electronic devices 230.1-230.*n* through a server via the network 220. In either example, the network 220 may be any of the Internet, a local area network, a wide area network, a cellular network, etc. Thus, for instance, the electronic devices 230.1-230.*n* may access the interactive slide deck through a webpage on their respective displays 232.

According to an example, and as discussed in greater detail below, the manner in which the computing apparatus 100 may generate the interactive slide deck generally enables users of the electronic devices 230.1-230.*n* the ability to interact with the generated slide deck. That is, users may navigate through the slide deck, such as by jumping backward or forward through the slides in the slide deck. In addition, the interactive slide deck may be displayed while maintaining movement of entities, such as animation in a presentation slide, a movement of an entity in a surveillance video, etc., in the images received from the image source 210. Moreover, as the interactive slide deck includes static images as well as animated image files, such as GIF files, the interactive slide deck disclosed herein may require relatively less memory capacity and thus bandwidth requirements than videos.

Turning now to FIG. 3, there is shown a flow diagram of a method 300 of generating an interactive slide deck, according to an example. It should be apparent to those of ordinary skill in the art that the method 300 represents a generalized illustration and that other operations may be added or existing operations may be removed, modified, or rearranged without departing from a scope of the method 300. Although particular reference is made to the computing apparatus 100 depicted in FIGS. 1 and 2 as being an apparatus that may implement the operations described in the method 300, it should be understood that the method 300 may be performed in differently configured apparatuses without departing from a scope of the method 300.

At block 302, a series of video frames may be accessed, in which a first set of the video frames depicts segments of an entity moving relative to other entities in the video frames and wherein a second set of the video frames depicts static content. For instance, the video frame accessing module 104 may access video frames of a video that is to be generated into an interactive slide deck. According to an example, the series of video frames may have previously been generated by the slide deck generating apparatus 102 or another apparatus, such as the image source 210.

According to another example in which a series of presentation slides are to be generated into the interactive slide deck, the video frame accessing module 104 may generate a video of the series of presentation slides. For instance, the video may be generated through use of a slide presentation tool that is to generate a video of the presentation slides by recording video of each of the presentation slides for a predetermined length of time, e.g., approximately 2 seconds. In another example, the video may be generated through a recording of the presentation slides as the presentation slides are sequentially displayed.

According to an example, the series of presentation slides may include a presentation slide in which an animation, such as movement of entities relative to other objects (e.g., words, characters, pictures, graphics, etc.), is provided. The animation may be an animation that may be inserted into a presentation slide to provide desired effects on the material contained in the presentation slide. In any regard, the generation of the video of the presentation slides may capture the animation on the presentation slide(s) in a group of adjacent video frames.

At block 304, the video frames having animation may be generated, e.g., bundled, into animated image files. For instance, the frame generating module 108 may bundle the video frames in the first set of video frames into animated graphics interchange format (GIF) files. As such, the generation of the animated image files may not require video codex and may thus be accessible on multiple types of web browsers. The frame generating module 108 may implement a custom or a commercially available animated GIF file generating tool to generate the animated GIF files. In any regard, the animated GIF files may be generated to take up a relatively smaller amount of memory space as compared with the video frames from which the animated GIF files are generated. The animated GIF files may also be generated to respectively have a single loop when activated.

In instances where, for example, the first set of video frames include a number of video frames that exceed a predefined threshold, a plurality of animated GIF files may be generated from the first of video frames that depict segments of the same animation. The predefined threshold may be user defined, may be based upon a complexity of the motion of an entity depicted by the video frames, may be based upon an amount of storage space each animated GIF file is to require, etc.

At block 306, the video frames having static content may be collapsed into single image files. According to an example, each of the single image files may correspond to a different presentation slide. In any regard, for each of the single image files, the frame collapsing module 110 may select one of the video frames, e.g., the first video frame in the second set, to be the single image file and may remove, e.g., delete, the remaining video frames in the second set of video frames. In addition, the frame collapsing module 110 may convert the selected video frame into a single GIF image file. According to an example, the single image files may be saved in a format that enables text extraction.

At block 308, the animated image files, e.g., animated GIF files, and the single image files, e.g., single GIF image files, may be arranged into an interactive slide deck. For instance, the frame arranging module 112 may arrange the animated image files and the single image files according to the order in which the video frames in which the animated image files and the single image files were arranged in the accessed series of video frames. The frame arranging module 112 may arrange a plurality of animated image files and a plurality of single image files in this manner. In addition, the frame arranging module 112 may generate a plurality of thumbnails corresponding to the animated image files and the single image files through use of a custom or commercially available thumbnail generating tool. In addition, the thumbnails may be arranged in the same order in which the animated image file and the single image file are arranged. Moreover, the thumbnails that represent an animated image file may depict the movement of an entity.

In any regard, as is generally known with conventional thumbnails of slide decks, selection of a particular thumbnail may cause the animated image file or the single image file corresponding to the selected thumbnail to be displayed. According to an example, selection of a thumbnail corresponding to an animated image file may cause the animated image on the animated image file to become activated and the animated image may be displayed. Thus, for instance, a single loop of an animated GIF may be displayed upon display of the animated image file.

At block 310, the interactive slide deck may be stored. For instance, the storing module 114 may store the interactive slide deck, which is also equivalently described herein as an interactive series of slides, in a storage device that may be accessible to the electronic devices 230.1-230.n. The storing module 114 may thus store the interactive slide deck in the data store 130, in a removable storage device, etc. In another example, the interactive slide deck may be stored on a server or a database that is accessible to the server, such that the electronic devices 230.1-230.n may access the interactive slide deck through the server via a network 220. In any regard, the electronic devices 230.1-230.n may download and/or stream the interactive slide deck over the network 220.

In one regard, through generation of the animated image files and the single image files in the manners disclosed herein, the interactive slide deck may be displayed on multiple types of web browsers while enabling interactivity of the slides.

Figure 4:
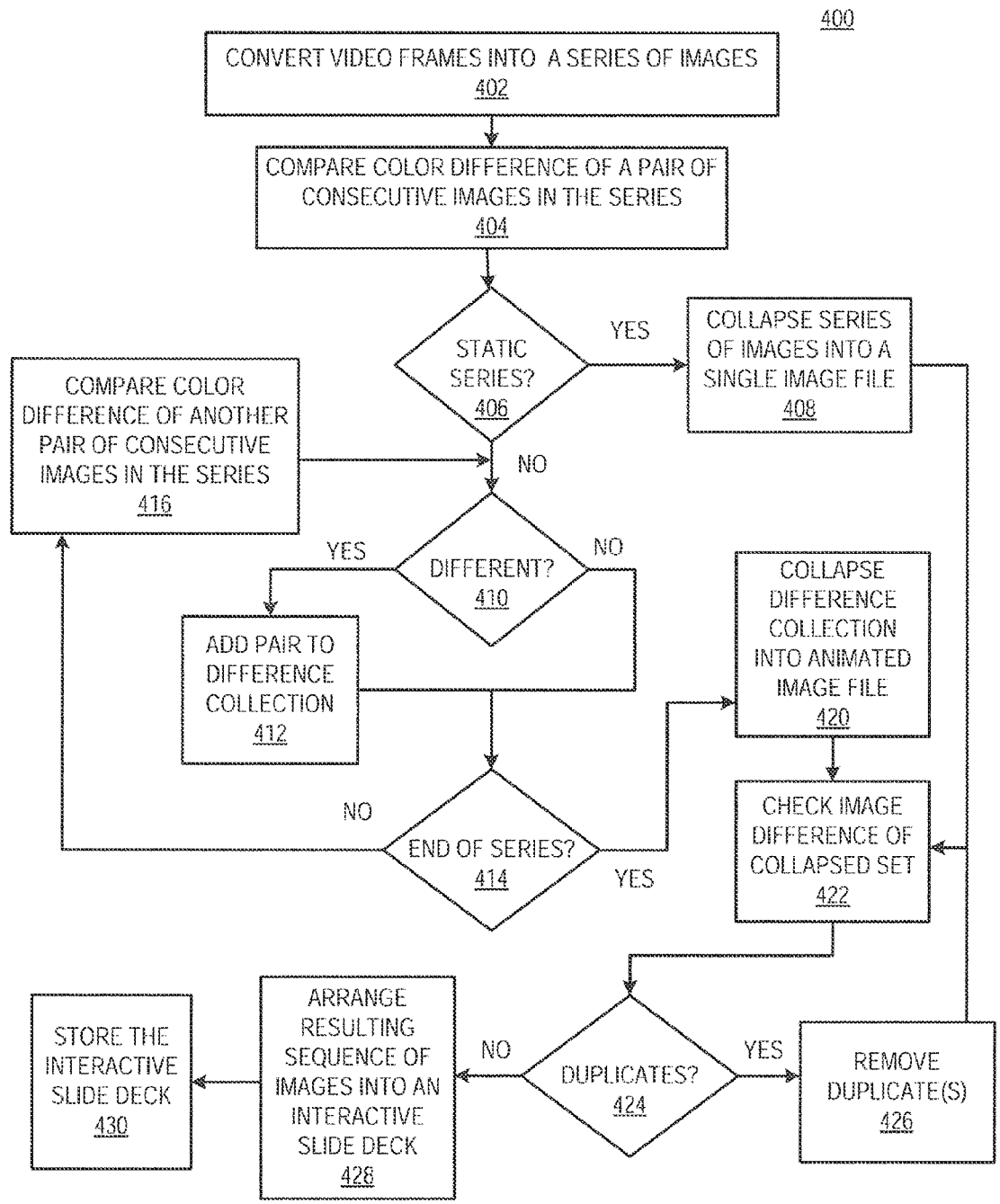
FIG. 4 depicts a flow diagram of a method of generating an interactive slide deck, according to another example of the present disclosure.

Turning now to FIG. 4, there is shown a flow diagram of a method 400 of generating an interactive slide deck, according to another example. The method 400 may be similar to the method 300, but may include additional operations. According to an example, the method 400 may be implemented to generate an interactive slide deck as a consecutive series of video frames is accessed and processed.

At block 402, a plurality of video frames may be converted into a series of images through any suitable conversion process. At block 404, a color difference of a pair of consecutive images in the series of images may be compared. For instance, a pixel-by-pixel color difference may be determined between the pair of consecutive images.

At block 406, a determination may be made as to whether the series of images is a static series of images. For instance, the series of images may be determined to be a static series of images if the images do not contain color differences with respect to each other. For instance, the frame content determining module 106 may determine that the images depict static content, e.g., a particular presentation slide, in response to the pixels in the series of images, for instance, around 10 or more images, remaining substantially constant. For instance, adjacent images having mean absolute error (MAE) or difference of less than about 0.000001 in pixel values with respect to each other may be determined to depict the same static content and thus, the series of images may be determined as being a static series of images. In that case, the series of images may be collapsed into a single image file, as indicated at block 408.

However, in response to a determination that the series of images is not a static series of images, that is, that at least a pair of consecutive images in the series contain a color difference, at block 410, a determination may be made as to whether the color difference between the pair of consecutive images in the series exceeds a predetermined threshold. For instance, the frame content determining module 106 may determine that the pixels in the pair of consecutive images contain color differences that exceed a predetermined threshold value, which may be indicative of the consecutive images depicting an animation. According to a particular example, the predetermined threshold value of the difference between the pair of consecutive images may be about 0.0001% with respect to each other.

In response to a determination that a color difference between the pair of consecutive images exceeds the predetermined threshold value, the pair of consecutive images may be added to a difference collection, as indicated at block 412. The difference collection may, for instance, be stored in a buffer in the data store 130. In response to a determination at block 410 that a color difference between the pair of consecutive images does not exceed the predetermined threshold value or following block 412, a determination may be made as to whether the pair of consecutive images are the last images in the series of images, as indicated at block 414.

In response to a determination that the pair of consecutive images are not the last images in the series of images, at block 416, a color difference of another pair of consecutive images in the series of images may be compared. In addition, blocks 410-414 may be repeated with respect to the another pair of consecutive images. Moreover, blocks 410-416 may be repeated for any additional pairs of consecutive images remaining in the series of images.

In response to a determination at block 414 that a currently processed pair of images are the last images in the series of images, the pairs of consecutive images in the difference collection may be collapsed into an animated image file, as indicated at block 420. The pairs of consecutive images in the difference collection may be collapsed into the animated image file in any of the manners discussed above with respect to block 304 in FIG. 3.

At block 422, the single image file collapsed at block 408 may be checked against another single image file and the animated image file collapsed at block 420 may be checked against another animated image file. In one regard, at block 422, the single image file generated at block 408 may be checked against a previously generated single image file and the animated image file generated at block 420 may be checked against a previously generated animated image file. By way of example, the image difference between animated image file generated at block 420 may be checked by comparing a first or a last image in the animated image file to a preceding or succeeding image.

At block 424, a determination may be made as to whether the single image file generated at block 408 is a duplicate of a previously generated single image file and/or whether the animated image file generated at block 420 is a duplicate of a previously generated animated image file. If a duplicate(s) exists, the duplicate(s) may be removed as indicated at block 426. In addition, blocks 422-426 may be repeated to remove any remaining duplicates.

At block 428, following a determination that no duplicates exist, the resulting sequence of images, e.g., the animated image file(s) and the single image file(s), may be arranged into an interactive slide deck. The images may be arranged into the interactive slide deck in any of the manners discussed above. In addition, at block 430, the interactive slide deck may be stored in any of the manners discussed above.

Some or all of the operations set forth in the methods 300 and 400 may be contained as a utility, program, or subprogram, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
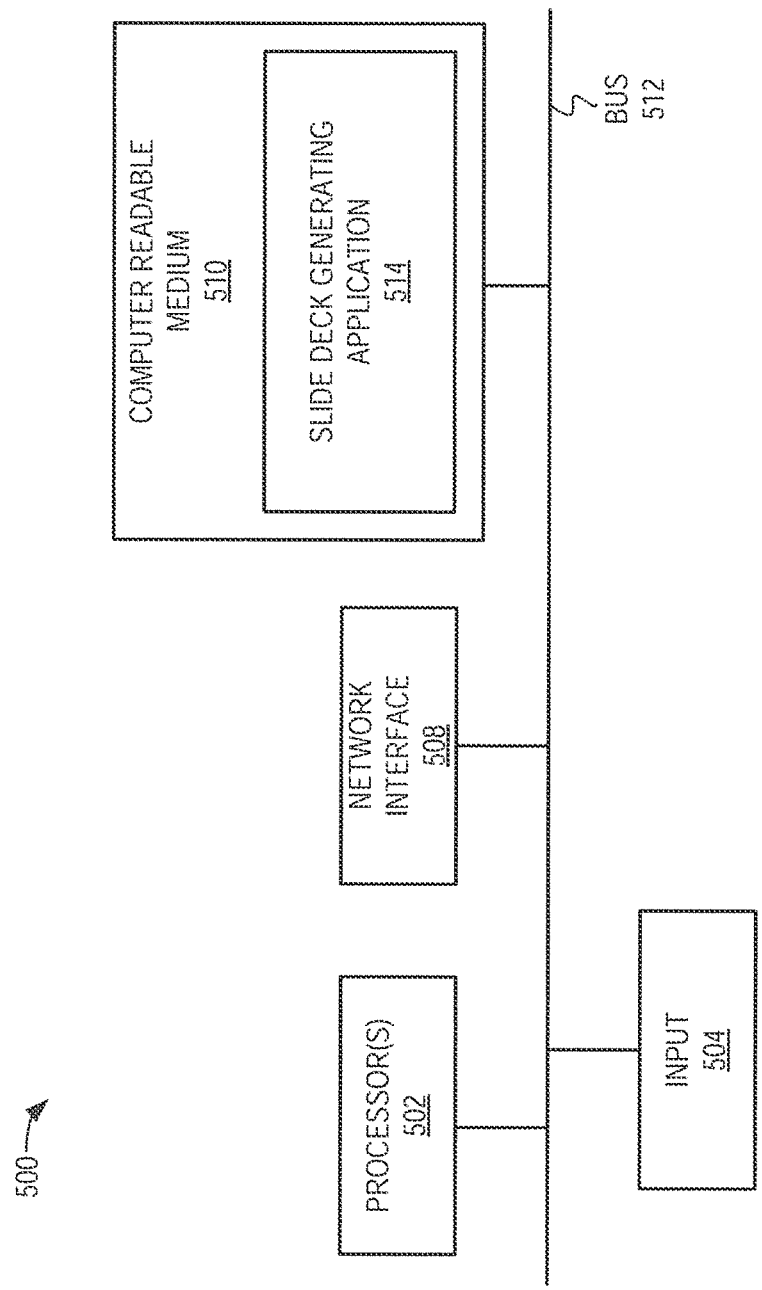
FIG. 5 illustrates a schematic representation of an electronic device, which may be employed to perform various functions of the computing apparatus depicted in FIGS. 1 and 2, according to an example of the present disclosure.

Turning now to FIG. 5, there is shown a schematic representation of an electronic device 500, which may be employed to perform various functions of the computing apparatus 100 depicted in FIGS. 1 and 2, according to an example. The device 500 may include a processor 502, an input 504; a network interface 508, such as a Local Area Network LAN, a wireless 802.11x LAN, a 3G mobile WAN or a WiMax WAN; and a computer-readable medium 510. Each of these components may be operatively coupled to a bus 512.

The computer readable medium 510 may be any suitable medium that participates in providing instructions to the processor 502 for execution. For example, the computer readable medium 510 may be non-volatile media, such as an optical or a magnetic disk; volatile media, such as memory. The computer-readable medium 510 may also store a slide deck generating application 514, which may perform the methods 300 and 400 and may include the modules of the slide deck generating apparatus 102 depicted in FIG. 1. In this regard, the slide deck generating application 514 may include a video frame accessing module 104, a frame content determining module 106, a frame generating module 108, a frame collapsing module 110, a frame arranging module 112, and a storing module 114.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of generating an interactive slide deck, said method comprising:

accessing a series of video frames, wherein a first set of the video frames depicts segments of an entity moving relative to other entities in the video frames and wherein a second set of the video frames depicts static content;

generating, by a processor, the video frames in the first set of video frames into animated image files;

collapsing, by the processor, the video frames in the second set of video frames into single image files; and arranging the animated image filed and the single image files into the interactive slide deck;

wherein the processor processes the series of video frames into the first and second sets of video frames as the series of video frames are accessed by the processor, by:

converting the series of video frames into a series of images;

comparing a color difference of a pair of consecutive images in the series of images;

determining whether a plurality of consecutive images in the series of images is static;

in response to a determination that the plurality of consecutive images in the series of images is static, and therefore are part of the second set of video frames, collapsing the plurality of consecutive images in the series of images into the single image file;

in response to a determination that the plurality of consecutive images in the series of images is not static, and therefore are part of the first set of video frames, determining whether the color difference between the pair of consecutive images in the plurality of consecutive images in the series of images exceeds a predetermined threshold;
a) in response to a determination that the color difference between the pair of consecutive images in the plurality of consecutive images in the series of images exceeds a predetermined threshold, adding the plurality of consecutive images in the series of images to the difference collection;
b) determining whether an end of the series of images has been reached;
c) in response to determining that an end of the series of images has not been reached, comparing a color difference of another pair of consecutive images in another plurality of consecutive images in the series of images;
d) determining whether the color difference between the another pair of consecutive images in the another plurality of consecutive images in the series of images exceeds the predetermined threshold;
e) in response to a determination that the color difference between the another pair of consecutive images in the another plurality of consecutive images in the series of images exceeds the predetermined threshold, adding the another plurality of consecutive images in the series of images to the difference collection
f) repeating b)-e) until a determination that an end of the series of images has been reached is made.

2. The method according to claim 1, wherein generating the video frames in the first set of video frames into the animated image files further comprises generating the video frames in the first set of video frames into animated graphics interchange format (GIF) files and wherein collapsing the video frames in the second set of video frames into single image files further comprises collapsing the video frames in the second set of video frames into single GIF image files.

3. The method according to claim 2, further comprising:
storing the interactive slide deck to be accessible by a plurality of computing devices.

4. The method according to claim 1, wherein accessing the series of video frames further comprises generating the video frames from an input set of presentation slides, and wherein the entity moving relative to other entities in the video frames comprises a depiction of animation in a presentation slide.

5. The method according to claim 1, further comprising:
generating a plurality of thumbnails corresponding to the animated image files and the single image files, wherein a thumbnail of the plurality of thumbnails corresponding to the animated image files depicts movement of the entity relative to other entities in the video frames.

6. The method according to claim 1, further comprising:
g) checking the single image file against another single image file and the animated image file against another animated image file;
h) determining whether a duplicate of either or both of the single image file and the animated image file exists;
j) removing any duplicates; and
k) repeating g)-j) until no duplicates are determined to exist at h; and
wherein arranging a resulting sequence of images into the interactive slide deck further comprises arranging a sequence of images resulting from g)-k) into the interactive slide deck.

7. An apparatus to generate an interactive series of slides, said apparatus comprising:

a processor;
a memory on which is stored machine readable instructions that cause the processor to:
access a series of video frames, wherein a first set of the video frames depicts segments of an entity moving relative to other entities in the video frames and wherein a second set of the video frames depicts static content;
identify the first set of video frames and the second set of video frames;
generate the video frames in the first set of video frames into an animated graphics interchange format (GIF) file; and
collapse the video frames in the second set of video frames into a single GIF file; and
arrange the animated GIF file and the GIF image file into the interactive series of slides;
wherein the processor identifies the first and second sets of video frames from the series of video frames as the series of video frames are accessed by the processor, by;
converting the series of video frames into a series of images;
comparing a color difference of a pair of consecutive images in the series of images;
determining whether a plurality of consecutive images in the series of images is static;
in response to a determination that the plurality of consecutive images in the series of images is static, and therefore are part of the second set of video frames, collapsing the plurality of consecutive images in the series of images into the single image file;
in response to a determination that the plurality of consecutive images in the series of images is not static, and therefore are part of the first set of video frames, determining whether the color difference between the pair of consecutive images in the plurality of consecutive images in the series of images exceeds a predetermined threshold;
a) in response to a determination that the color difference between the pair of consecutive images in the plurality of consecutive images in the series of images exceeds a predetermined threshold, adding the plurality of consecutive images in the series of images to the difference collection;
b) determining whether an end of the series of images has been reached;
c) in response to determining that an end of the series of images has not been reached, comparing a color difference of another pair of consecutive images in another plurality of consecutive images in the series of images;
d) determining whether the color difference between the another pair of consecutive images in the another plurality of consecutive images in the series of images exceeds the predetermined threshold;
e) in response to a determination that the color difference between the another pair of consecutive images in the another plurality of consecutive images in the series of images exceeds the predetermined threshold, adding the another plurality of consecutive images in the series of images to the difference collection
f) repeating b)-e) until a determination that an end of the series of images has been reached is made.

8. The apparatus according to claim 7, wherein the machine readable instructions are further to cause the processor to:

store the animated GIF file and the GIF image file at a plurality of different resolutions.

9. The apparatus according to claim 7, wherein, to access the series of the video frames, the machine readable instructions are further to cause the processor to:

generate the video frames from an input set of presentation slides, wherein the entity moving relative to other entities in the video frames comprises a depiction of an animation in a presentation slide of the input set of presentation slides.

10. A non-transitory computer readable storage medium on which is stored machine readable instructions that when executed by a processor are to cause the processor to:

access a series of video frames, wherein a first set of the video frames depicts segments of an entity moving relative to other entities in the video frames and wherein a second set of the video frames depicts static content;

identify the first set of video frames and the second set of video frames;

generate the video frames in the first set of video frames into an animated graphics interchange format (GIF) file; and collapse the video frames in the second set of video frames into a single GIF file; and arrange the animated GIF file and the GIF image file into the interactive series of slides;

wherein the processor identifies the first and second sets of video frames from the series of video frames as the series of video frames are accessed by the processor, by:

converting the series of video frames into a series of images;

comparing a color difference of a pair of consecutive images in the series of images;

determining whether a plurality of consecutive images in the series of images is static;

in response to a determination that the plurality of consecutive images in the series of images is static, and therefore are part of the second set of video frames, collapsing the plurality of consecutive images in the series of images into the single image file;

in response to a determination that the plurality of consecutive images in the series of images is not static, and therefore are part of the first set of video frames, determining whether the color difference between the pair of consecutive images in the plurality of consecutive images in the series of images exceeds a predetermined threshold;

a) in response to a determination that the color difference between the pair of consecutive images in the plurality of consecutive images in the series of images exceeds a predetermined threshold, adding the plurality of consecutive images in the series of images to the difference collection;

b) determining whether an end of the series of images has been reached;

c) in response to determining that an end of the series of images has not been reached, comparing a color difference of another pair of consecutive images in another plurality of consecutive images in the series of images;

d) determining whether the color difference between the another pair of consecutive images in the another plurality of consecutive images in the series of images exceeds the predetermined threshold;

e) in response to a determination that the color difference between the another pair of consecutive images in the another plurality of consecutive images in the series of images exceeds the predetermined threshold, adding the another plurality of consecutive images in the series of images to the difference collection f) repeating b)-e) until a determination that an end of the series of images has been reached is made.

11. The non-transitory computer readable storage medium according to claim 10, wherein the machine readable instructions are further to cause the processor to generate the video frames from an input set of presentation slides, wherein the entity moving relative to other entities in the video frames comprises a depiction of an animation in a presentation slide of the input set of presentation slides.

* * * * *